United States Patent [19]
Lipes

[11] 3,877,199
[45] Apr. 15, 1975

[54] FRANKFURTER PACKAGING MACHINE

[76] Inventor: Arnold Lipes, 6521 Merton Rd., Cote St. Luc, Montreal, Quebec, Canada

[22] Filed: Aug. 31, 1973

[21] Appl. No.: 393,476

[52] U.S. Cl. .................................. 53/59 R; 53/78
[51] Int. Cl. ........................................ B65b 57/20
[58] Field of Search ....... 53/59 R, 78; 198/30, 53 R, 198/54, 56, 183

[56] References Cited
UNITED STATES PATENTS

| | | | |
|---|---|---|---|
| 2,154,844 | 4/1939 | Harker | 198/183 |
| 3,207,909 | 9/1965 | Lakso | 53/59 R X |
| 3,241,625 | 3/1966 | Soojian | 177/120 |
| 3,428,161 | 2/1969 | Niederer | 198/30 |
| 3,444,986 | 5/1969 | Van Huis | 198/56 |
| 3,535,847 | 10/1970 | Strohmeier | 53/59 R |
| 3,618,819 | 11/1971 | Blackburn | 53/59 R X |
| 3,707,216 | 12/1972 | Peres | 198/30 |
| 3,730,386 | 5/1973 | Monsees | 53/78 X |
| 3,741,371 | 6/1973 | Oldershaw | 198/183 X |
| 3,744,616 | 7/1973 | Guillemette | 198/56 |

Primary Examiner—Travis S. McGehee
Assistant Examiner—John Sipos

[57] ABSTRACT

A loading apparatus for packaging rod-like articles in a container. The apparatus comprises an endless driven conveyor having spaced apart conveying elements thereon and means for positioning the rod-like articles onto the conveyor. The conveyor has a delivery end for delivering a predetermined number of the articles to a container. Counter means are associated with the conveyor for detecting and counting the articles transported by the conveyor. An accumulator is positioned adjacent the delivery end of the conveyor for receiving the articles therein. The accumulator is activated to interrupt and receive articles being discharged from the delivery end of the conveyor and to release the accumulated articles therein upon further activation.

9 Claims, 3 Drawing Figures

FRANKFURTER PACKAGING MACHINE

BACKGROUND OF INVENTION (a) Field of the Invention

The present invention relates to a loading apparatus for packaging a predetermined number of rod-like articles in a container.

More particularly, but not exclusively, the invention relates to a loading apparatus for packaging predetermined quantities of frankfurters in a carton.

(b) Description of Prior Art

Various packaging or accumulating machines are known for handling and transferring frankfurters for packaging, from the output of a frankfurter processing machine. In some of these machines, the frankfurters are separated in predetermined groups and stacked in layers for packaging by groups and this requires elaborate mechanisms and supervisory personnel. Also, the handling speed of such machine is very slow as many operations must be performed to group the articles in containers prior to packaging. In a further handling apparatus, it is required that an article be engaged by each conveying lug in order to achieve an accurate count. Other known methods and apparatus for obtaining predetermined quantities of articles is to weigh the package contents whereby to determine the number of articles by means of the weight of the contents. The problem of such a method is that it is very difficult to control the stoppage of the machine once the correct weight has been reached. The majority of these apparatus also require many operators and inspectors to assure its proper functioning and quality control. If the foodstuff articles are handled by hand, it renders it less sanitary.

SUMMARY OF INVENTION

It is a feature of the present invention to provide a loading apparatus for packaging rod-like articles which does not require manual count, which operates very rapidly, and which automatically counts the number of articles packaged in a container.

It is a further feature to provide a loading apparatus for packaging frankfurters and which substantially overcomes the disadvantages of the prior art and which is compact, economical and sanitary.

Accordingly, from a broad aspect, the present invention provides a loading apparatus for packaging rodlike articles in a container. The apparatus comprises an endless driven conveyor having spaced apart conveying elements thereon. A deflector housing is positioned above the conveyor at a receiving end thereof for receiving the rod-like articles projected therein along their longitudinal axis and in a sequential manner. The deflector housing has directing means for aligning the rod-like articles received therein onto the conveyor to permit the articles to be transported by the conveyor at a rate faster than the articles are received by the deflector housing. The conveyor has a delivery end for delivering a predetermined number of the articles to a container. Counter means are associated with the conveyor for detecting and counting the articles transported by the conveyor. An accumulator is positioned adjacent the delivery end of the conveyor for receiving the articles therein. The accumulator is activated in interrupt and receive articles being discharged from the delivery end of the conveyor and to release the accumulated articles therein upon further activation.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
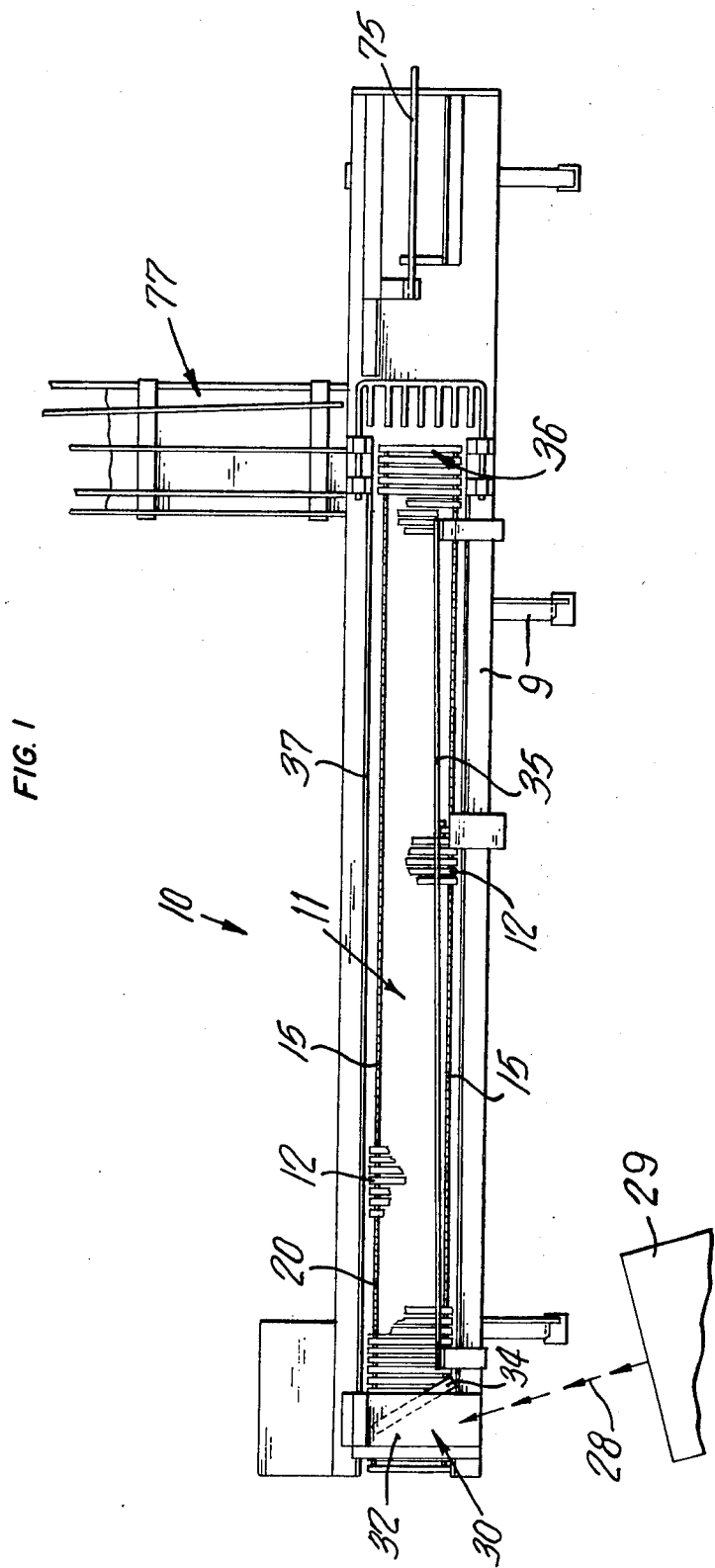
FIG. 1 is a plan view, partly fragmented, of the loading apparatus of the present invention.
Figure 2:
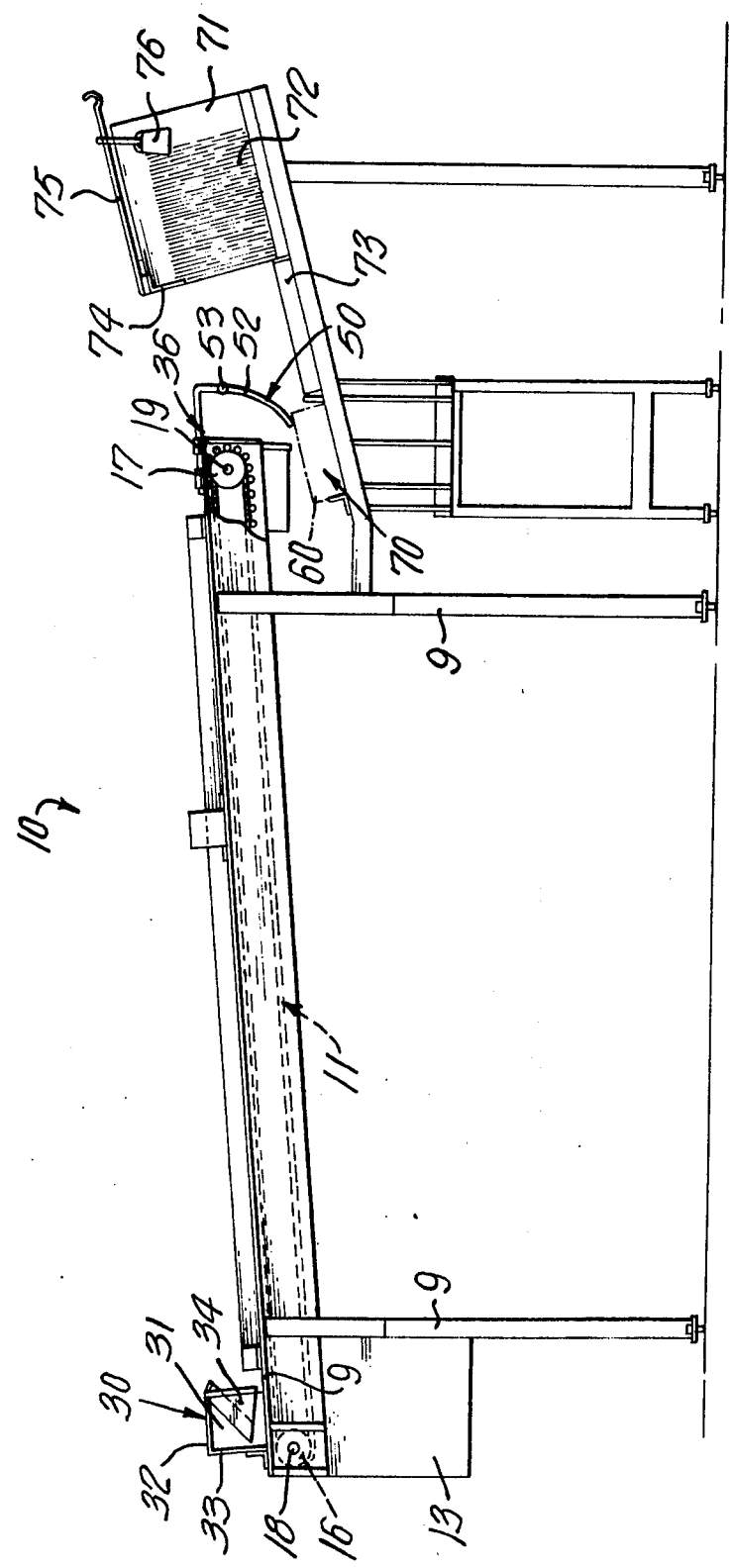
FIG. 2 is a side view, partly fragmented, of the apparatus shown in FIG. 1.

Referring now to the drawings, and more particularly to FIGS. 1 and 2, there is shown generally at 10, the loading apparatus of the present invention. The apparatus comprises an endless conveyor 11 having spaced apart conveying elements 12. The drive means for the conveyor is located in the housing 13 and consists of conventional motors and drive sprockets and connecting drive chains (not shown). Means are also provided for positioning rod-like articles 14 (see FIG. 3) onto the conveyor 11 and between the conveying elements 12.

Figure 3:
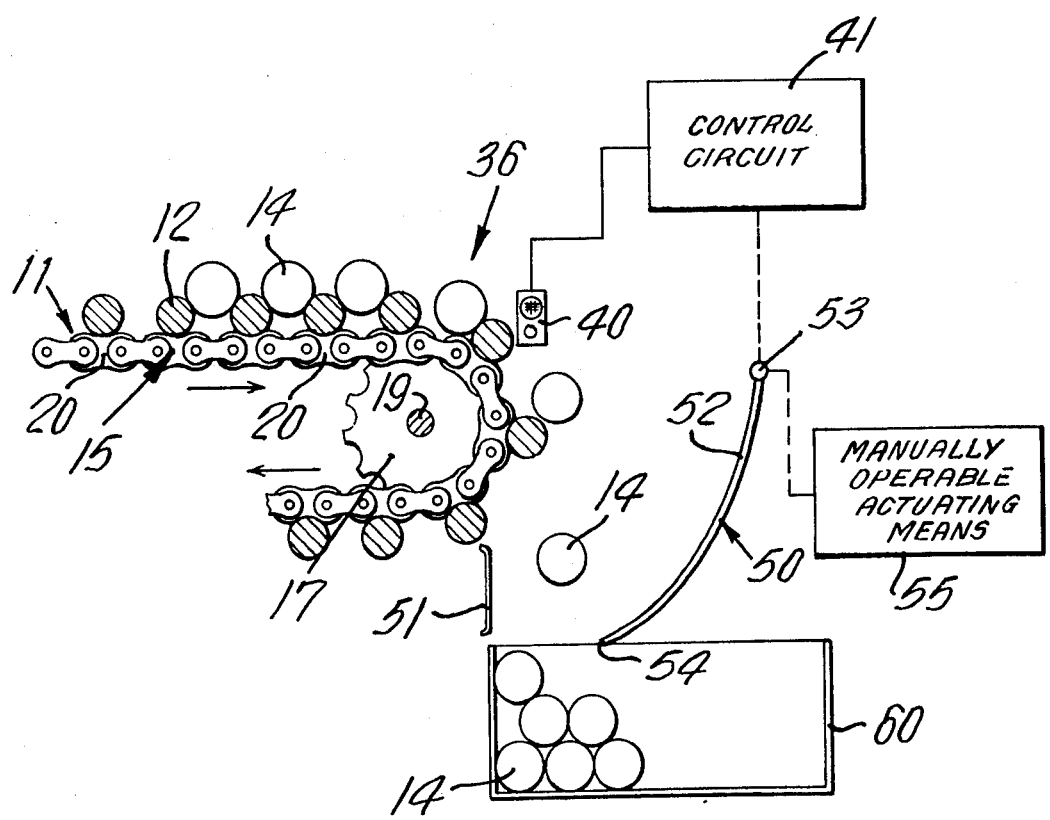
FIG. 3 is a sectional side view of a portion of the loading apparatus of FIG. 1 showing the apparatus at the discharge end of the conveyor.

Referring further to FIG. 3, it can be seen that the endless conveyor 11 is formed by two spaced apart endless chains 15 and secured about respective drive sprockets 16 and idler sprockets 17. The drive sprockets 16 are mounted on a common drive shaft 18 whilst the idler sprockets 17 are mounted on a common idle shaft 19. The conveying elements 12 are constituted by elongated circular bars welded or suitably secured between the links 20 of each of the chains 15 and extending transversely to the longitudinal axis of these endless chains.

The rod-like articles 14 are positioned onto the conveyor 11 by means of a deflector housing 30 and which constitutes a directing means for aligning the rod-like articles which are received therein with the conveying elements 12. In the present embodiment, the rod-like articles 14 are frankfurters, and these are shot from a peeling macine 29 in the direction of the arrows 28 towards the deflector housing 30 and more particularly in the open end 31 thereof. The housing is formed by a downwardly inclined upper wall 32 extending transversely of the conveyor, a vertical side wall 33 which is disposed substantially parallel to the conveying elements and in a fixed position on the conveyor support framework 9, and an inwardly angulated tapering side wall 34. Thus, it can be seen that as the articles are shot into the open end 31 of the housing 30, they are deflected downwardly and are aligned substantially parallel to the conveying elements 12 whereby the articles are lodged between adjacent ones of the conveying elements 12 but not necessarily between each adjacent one of the conveying elements. In other words, there may be vacant spaces between certain ones of the conveying elements along the length of the endless conveyor 11. However, it is not essential with the present apparatus to ensure that an article is engaged between every pair of conveying elements as the counting of the articles is not dependent thereupon.

As the articles 14 are conveyed along the endless conveyor 11, these are aligned transversely with one another by means of an adjustable reciprocating bar 35 secured above and extending along a portion of the conveyor 11 and being reciprocated in a direction transverse to its longitudinal axis in a horizontal plane. The elongated bar 35 pushes misaligned articles to cause these articles to abut against a stationary guide wall 37 whereby the articles will arrive at the delivery end 36 of the conveyor in substantially aligned relationship.

Referring more particularly to FIG. 3, there is shown a counter means, herein a photocell 40, for detecting and counting the articles 14 transported by the conveyor to the delivery end 36. The photocell 40 is positioned to one side of the conveyor above the conveying elements 12 and provides a signal to control circuit 41 every time an article passes by the photocell. Once a predetermined number of articles are counted by the control circuit 41, and accumulator 50 is activated.

The accumulator 50 is provided adjacent the delivery end 36 of the endless conveyor 11 whereby to interrupt and receive articles 14 being delivered to a container 60 positioned adjacent and below the delivery end 36. Hereinshown, the accumulator comprises a stationary wall plate 51 and a hinged accumulator plate 52 moveable about a pivot point 53. The free end 54 of the accumulator plate 52 will move to engage with the lower end of the stationary wall plate 51 whereby to form a compartment therebetween to receive and retain the rod-like articles 14 being delivered by the conveyor. Actuating means 55 are provided and connected to the accumulator whereby to cause actuation of the accumulator plate 52. The actuating means 55 is manually operable and will cause the plate 52 to retract or disengage with the stationary wall plate 51 to release the accumulated articles 14 therein into a further container 60 positioned at the receiving station 70 (see FIG. 2).

Referring to FIG. 2, there is shown a carton or container 60 positioned at the receiving station 70. Normally, the container 60 is housed in a container storage compartment 71 in its folded blank form. As shown, a plurality of cartons 72 can be stored for ready access to an operator located adjacent the receiving station. Whilst a container 60 is being filled at the receiving station, the operator will retract a folded container 72 from the storage compartment 71 and open it and place it at a standby position 73 ready for substitution for the container 60 being filled with the articles. The storage compartment 71 consists of a retaining bracket 74, a sliding bar 75 on which a weight element 76 is slidably retained, whereby to apply forward pressure onto the cartons 72 to cause them to advance to a position for easy withdrawal. After the container 60 has been filled, its flaps are closed and the container is pushed onto an outlet conveyor 77 where it is then sent on for storage or shipping.

In operation, the articles are fed into the deflector housing 30 and normally in end-to-end relationship. In an arrangement as described above for loading frankfurters, the frankfurters are normally fed into the deflector housing at a rate of 9 to 10 per second. The endless conveyor 11 operates at a speed faster than the rate of injection of articles into the housing 30 whereby to assure that more conveying elements will go passed the housing 30 than the number of articles being fed thereto whereby the articles will not accumulate therein. The articles are then conveyed along the endless conveyor 11 and are aligned by the reciprocating aligning means 35, 37. When the article reaches the delivery end 36 of the conveyor, these are counted by the counter means 40 and fall into a container 60 positioned at a receiving station 70. When a predetermined number of articles have passed by the counter means 40, a control circuit 41 will actuate the accumulator plate 52 and cause it to close against a stationary plate 51. The speed of the conveyor is maintained constant and the articles continue to fall within the accumulator 50, between the plates 51 and 52. During this period, the operator closes the filled container 60 and pushes it onto an outlet conveyor 77. During the filling of the container 60, a further container has been prepared at position 73 and is now placed at the receiving station 70. The operator then operates an actuating means 55 which causes the accumulator plate 52 to release thus causing the accumulated articles 14 to be dropped into the empty container 60 positioned below the delivery end 36. The operator supervises the filling of the container 60 to assure that the articles are distributed throughout the interior of the container to permit proper closing of the container flap (not shown). Thus, it can be seen that the contents of each container is counted automatically permitting the packaging to be done at a very fast rate. The rate of discharge at the discharge end 36 of the conveyor is too fast for an operator to keep accurate visual count and this problem is eliminated with the present invention.

In a further embodiment of the invention, not requiring drawing illustration, a receptable is positioned below the accumulator 50 and receives the articles being discharged from the delivery end of the conveyor 11. After the predetermined number of these articles are delivered to the receptacle (not shown) the accumulator is activated to interrupt and receive the articles being discharged from the delivery end of the conveyor. During this period of time, the receptacle (not shown) is activated to release its predetermined load into a container, such as a bag or box. The release of articles can be done by various means. For example, the container may have a downwardly pointing V-configuration with one of the walls, or both, being hinged in order to release the load downwardly into a bag which is positioned around the mouth or over a portion of the V-shaped container. Another method of transferring the contents of the container may conceivably consist of transferring the entire container and replacing it with another container. Such an arrangement could be provided on a turret or straight conveyor arrangement for displacing the containers. This further embodiment would result in an increase of the time required to transfer the predetermined loaded articles from its article receiving position.

Although not described herein, the container 60 could be fed automatically to the receiving station 70. Also, the containers may be positioned end-to-end with their flaps extending outwardly to speed up the positioning of the container and to facilitate the manipulation of same. Further, although the operation herein described is for a loading apparatus for handling frankfurters, it is within the ambit of the invention to handle similar elongated articles, and not essentially foodstuff articles, without departing from the scope of the present invention which is defined in the appended claims.

I claim:

1. A loading apparatus for packaging rod-like articles in a container, said apparatus comprising an endless conveyor having spaced-apart conveying elements thereon, conveyor drive means, a deflector housing positioned above said conveyor at a receiving end therefor for receiving said rod-like articles aerially projected therein along their longitudinal axis and along a path angularly disposed to the path of movement of the conveyor and in a sequential manner, said deflector housing having a vertical side wall disposed substantially parallel to said conveying elements and a downwardly inclined upper wall adjacent thereto, said articles being projected axially against said upper wall whereby they are caused to deflect in a downward direction so that said articles are positioned and conveyed by respective ones of said conveying elements and being transported by said conveyor at a rate faster than said articles are received by said deflector housing, said conveyor having a delivery end for delivering a predetermined number of said articles to a container, counter means for detecting and counting said articles transported by said endless conveyor, and accumulator adjacent said delivery end of said conveyor for receiving said articles therein, said accumulator being activated to interrupt and receive articles being discharged from said delivery end of said conveyor and to release accumulated articles therein upon further activation.

2. A loading apparatus as claimed in claim 1 wherein said directing means comprises a downwardly tapering upper wall, a vertical side wall substantially parallel to said conveying elements and an inwardly angulated side wall, said housing directing said rod-like articles downwardly and substantially parallel to said conveying elements.

3. A loading apparatus as claimed in claim 1 wherein there is further provided adjustable reciprocating aligning means secured above said conveyor for aligning said rod-like articles being transported by said conveyor.

4. A loading apparatus is claimed in claim 1 wherein said accumulator consists of a stationary wall and a hinged accumulator plate, said accumulator plate being positioned for movement to and away from said stationary wall, said accumulator plate when positioned away from said stationary wall permitting the passage of articles from said conveyor delivery end to said container, said accumulator plate when moved in contact with said stationary wall receiving said articles between said stationary wall and said accumulator plate.

5. A loading apparatus as claimed in claim 4 wherein said counter means is connected to a control circuit for actuating said accumulator plate to move in contact with said stationary plate upon detection of a predetermined number of said articles, and manually operable actuating means for causing said accumulator plate to move away from said stationary plate.

6. A loading apparatus as claimed in claim 1 wherein said conveying elements are circular elongated bars secured between two endless chains positioned parallel to each other and secured about respective sprockets positioned on common shafts, said bars being spaced apart a distance sufficient to support one of said articles between adjacent ones of said bars.

7. A loading apparatus as claimed in claim 1 wherein said counter means is a photocell positioned to one side of said conveyor above said conveying elements to detect and count said articles transported between said conveying element.

8. A loading apparatus as claimed in claim 1 wherein said container is held on a container support platform positioned below said delivery end of said conveyor, a container storage compartment associated with said support platform, and further conveying means for transporting said containers filled with articles.

9. A loading apparatus as claimed in claim 1 wherein there is further provided a receptacle positioned at said delivery end to receive said articles being discharged by said conveyor and said accumulator, said receptacle being adapted to transfer its contents into said container.

* * * * *